Sept. 18, 1951  J. E. POINTON  2,568,252
DOUGH DIVIDER

Filed Dec. 22, 1947  4 Sheets-Sheet 1

INVENTOR.
JOHN EDWARD POINTON.
BY George B Willcox
ATTORNEY.

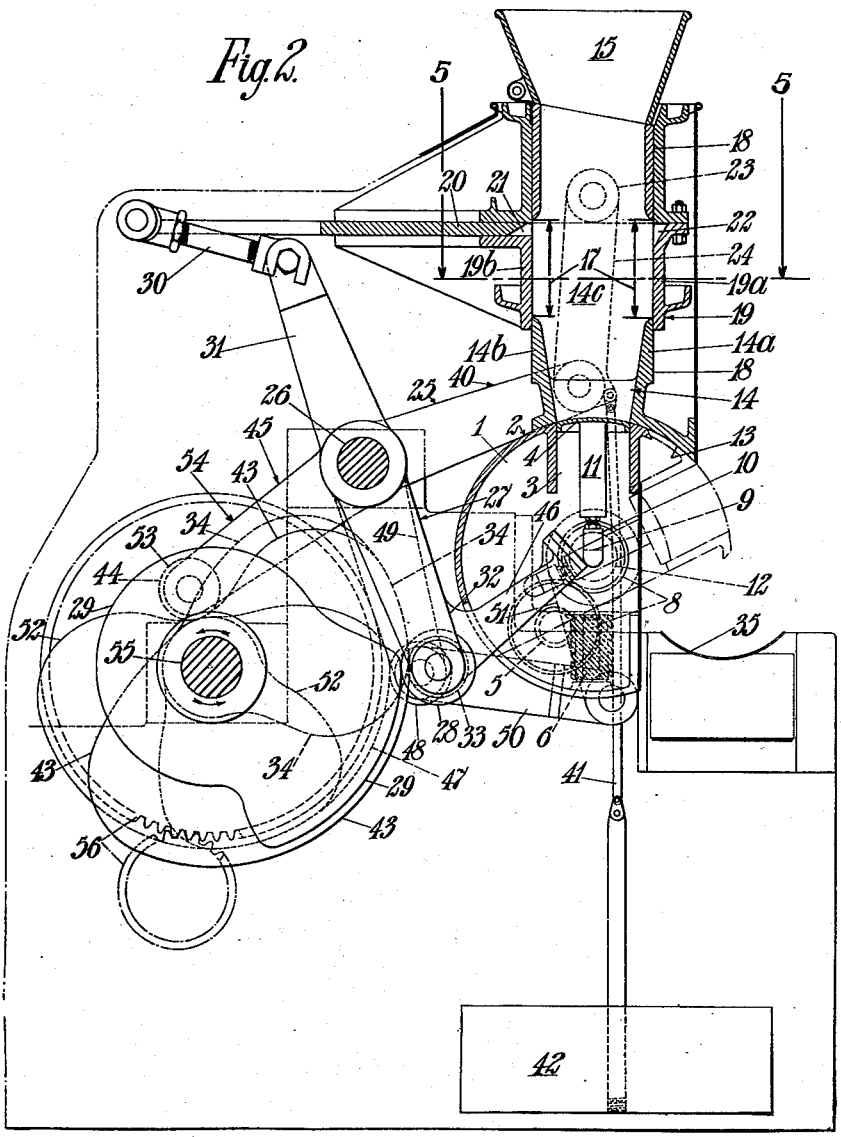

Sept. 18, 1951  J. E. POINTON  2,568,252
DOUGH DIVIDER
Filed Dec. 22, 1947  4 Sheets-Sheet 3
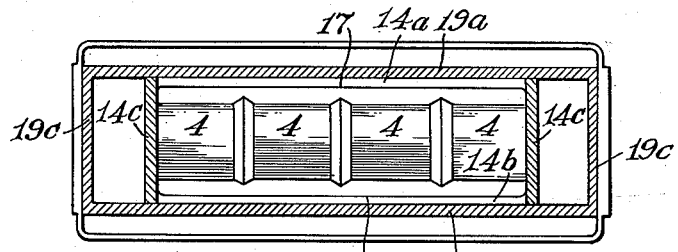
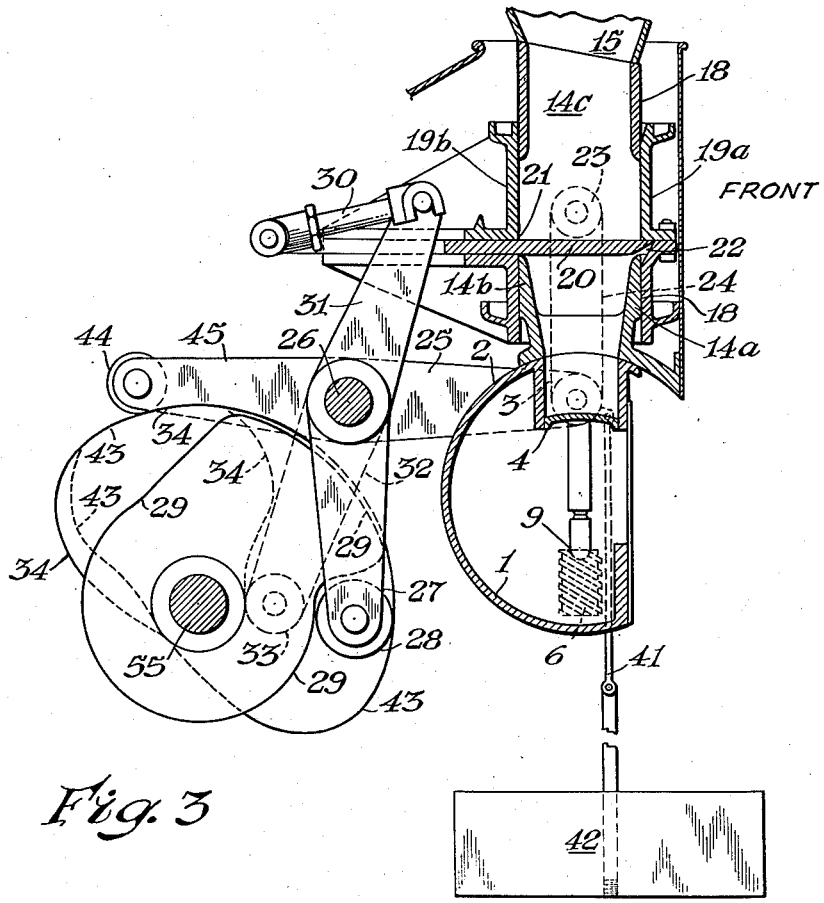
INVENTOR.
John Edward Pointon
BY
George B. Willett
ATTORNEY

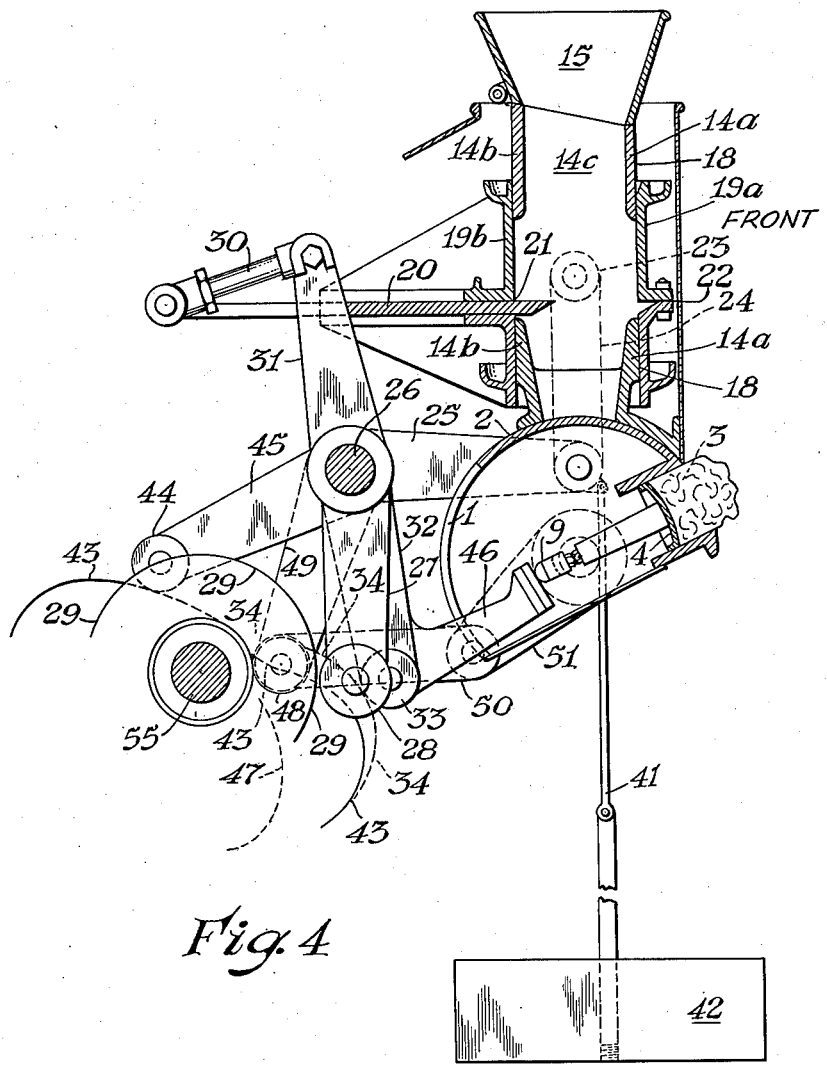

Patented Sept. 18, 1951

2,568,252

UNITED STATES PATENT OFFICE 2,568,252

DOUGH DIVIDER

John Edward Pointon, Peterborough, England, assignor to Baker Perkins Incorporated, Saginaw, Mich.

Application December 22, 1947, Serial No. 793,150
In Great Britain December 24, 1946

6 Claims. (Cl. 107—15)

This invention relates to machines for dividing bread doughs and the like. In present-day dividers dough from a hopper enters a horizontal ram chamber or top box on the rearward or suction stroke of a ram. A cut-off knife moves forward to cut off the hopper dough and the ram makes its charging stroke to fill a measuring pocket of the division head.

In these operations the direction of movement of the dough is turned through 90° and usually some of the dough entering the ram chamber is extruded back into the hopper on the forward stroke of the ram. Furthermore, in order to charge the pockets considerable pressure is exercised upon the dough, all of which produce an undesirable working or felling action upon the dough; and in dividers which rely upon a suction effect in the filling of the ram chamber accuracy of dough measurement depends to a considerable extent upon securing a predetermined constant suction action which is difficult to maintain under the wear and tear of operating conditions.

It has been proposed to depart from the above practice but with little success, by intermittently feeding dough from a hopper vertically into the pockets of a division head.

The aim of the present invention is to provide a divider in which the objectionable features of the present-day machines are reduced to a minimum by adopting a straight downward vertical movement of the dough through a flue into measuring pockets and employing a sequence of operations and means whereby dough is divided with a high degree of accuracy without subjecting it to undue pressure or felling action.

According to the invention frictional resistance to the displacement of dough in charging is reduced and suction action avoided. The improved principle of operation enables certain simplification of construction and also improvements in mechanical design to be utilized.

The invention consists of associated elements operable in a dough divider whereby a vertical stream or column of dough tends to move downwardly in a flue by gravity towards a division pocket; but is periodically severed by a transversely reciprocatable knife or cutter, operating crosswise of the flue, which follows up the dough movement beneath it on the downward stroke and provides light pressure upon the dough when charging the dough pocket. The dough supply above the knife follows it downwardly and is reunited to the dough column upon withdrawal of the knife.

It is preferred to cause the downward charging action of the knife or shutter to be effected under resilient pressure.

The fundamental action of the knife or shutter is that of a pusher or light ram operating on a section of the column of dough, and the severing or parting action of the dough effected by the knife is incidental to its gaining its charging or pushing position, ready to fill the division pocket.

The knife or shutter is suitably mounted in a vertically reciprocating carriage and during the charging stroke there is no relative movement between the carriage and the separated section of dough. There is no undesirable squeezing of the dough on the down stroke.

The invention also comprises a dough divider having: a partial rotary division head or box, the dough dividing pocket (or pockets) of which occupies a vertical charging position; a fixed antechamber, flue, or top box disposed vertically over the pocket and mating with the division head; a supply hopper aligned with the antechamber; a carriage which is vertically reciprocable intermediate the lower part of the hopper and the upper part of the antechamber. In the carriage is a knife or shutter, transversely reciprocable. Gap or clearance openings are being provided, front and rear, between the lower part of the hopper and the upper part of the antechamber; and means for operating the knife, carriage and division head in synchronism to divide and deliver dough pieces of predetermined weight.

In the accompanying drawings:

Figure 2 is an end view partly in section taken on line 2—2 of Fig. 1 with its parts operationally positioned as shown in Fig. 1.

Fig. 3 is a view similar to Fig. 2, parts being omitted for clearness, showing the knife inserted, the carriage down, and the plunger in the dividing head retracted.

Fig. 4 is a view similar to Figs. 2 and 3, showing the knife at its lowest position as in Fig. 3, but partly retracted and the plunger positioned to eject a dough piece.

Fig. 5 is a cross-section on line 5—5 of Fig. 2, showing, in plan, the relative arrangement of the carriage, the antechamber or flue and the openings in the front and rear walls of the antechamber.

Figure 1:
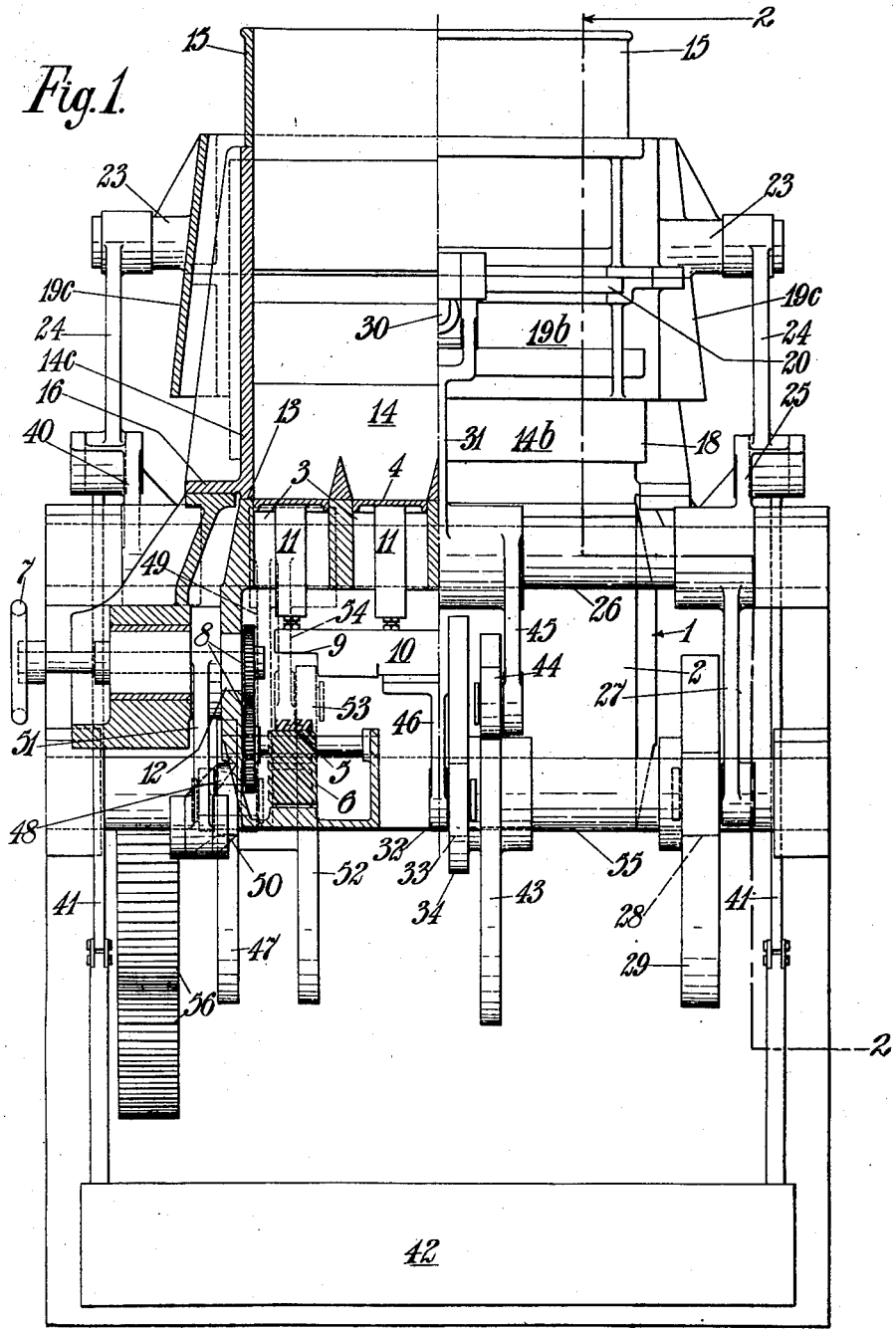
Figure 1 is a front view partly in section of a dough divider according to the invention, the operational position of the parts being such that the dough supply is held in the antechamber by means of conventional plungers in the pockets of the division head, and the knife is at its highest position.

In carrying the invention into effect according to one mode and described by way of example as applied to a multiple pocket divider, the division box or head 1, Figs. 2, 3, 4, has a cylindrical surface 2 which may conveniently extend over somewhat more than a quadrant. A longitudinal set of measuring chambers or pockets 3, wherein the volume of the dough is measured, is provided in the head with the major portion of the cylindrical surface 2 extending away from the charging position so that when the head is oscillated into the discharging position to cut off and deliver the dough, the residual dough in waiting is sealed off and supported.

Each pocket 3 is closed at its bottom by an adjustable ram or plunger 4 which is adapted to be reciprocated to eject the dough piece at the time of delivery. Adjustment means of known character are provided for determining the position of the plunger within the pocket for the purpose of measuring the volume of dough for 1 lb., or 2 lb. or other weight loaves or pieces. In the charging position the pockets are arranged with their axes vertical or substantially vertical.

The adjustment means comprise a pair of spiral gear wheels 5, 6 actuated by a hand wheel 7 and gearing 8.

The spiral gear 6 is adapted for engagement by the surface 9 of a ram bar 10 which is coupled to the ram rods 11.

By revolving spiral 6, it moves up or down on screw 6 as the inward movement of the ram 4 is controlled.

The head 1 is mounted upon shaft 12 or on trunnions so that it may be revolved through the desired angle from the charging position, which is vertical, to a position for the delivery of the divided dough pieces.

The cylindrical surface 2 of the head 1 is in sliding contact with a concave bearing surface 13 located at the lower delivery end of an antechamber 14 which is a stationary upright rectangular flue adapted to feed dough downwardly to the measuring pockets 3 from a dough supply hopper 15 mounted on the top end of the flue 14. Portions of the front wall 14a and rear wall 14b of the flue at about the middle of its height, are omitted as at 17 in order to accommodate operational movements of a shutter or knife 20. This knife embodies an important structural feature and mode of operation of my invention and will presently be described in detail. The end walls 14c of the flue are bolted on brackets 16 on the frame, Fig. 1, of the machine.

The front and rear walls of the antechamber have openings 17 extending the full width thereof, as shown particularly by dimension lines in Fig. 2.

The front and back flue walls 14a, 14b have exterior bearing surfaces 18 on which a knife carriage 19 is adapted to slide in vertical reciprocations as hereinafter described. The location and vertical depth of openings 17 in walls 14a and 14b of the antechamber and the vertical length of knife carriage 19 are appropriate to keep the openings closed during all vertical reciprocations of the carriage.

Carriage 19 comprises front and rear walls 19a, 19b that slide up-and-down on the bearing surfaces 18 of the flue or antechamber 14. The end walls 19c of the knife carriage are outside of and spaced from the end walls 14c. The rear wall 19b, Fig. 2, of the knife carriage is slotted at 21 to receive the knife or shutter 20. The knife carriage 19 may be formed as shown in Fig. 2, in two sections joined by front and rear flanges. The flanges of the rear wall 19b serve as a guide element for the knife in region of the slot 21.

The knife 20 is mounted for reciprocating through the slot 21 transversely across the antechamber 14. The forward edge of the knife enters a recess 22 provided in the front wall 19a to ensure a complete cut-off of the column of dough in the flue.

The carriage 19 is supported by trunnions 23 on its end walls 19c by links 24 of which one is pivotally connected to the arm 25 of a bell crank lever 25, 27, keyed on a rocker shaft 26. The other link 24 is pivotally connected to a lever 40 keyed on the shaft 26. The arm 27 of the bell crank lever carries a roller 28 engaging a rotatable cam 29 for controlling the reciprocation of the knife carriage 19 in synchronism with the transverse reciprocations of the knife 20 and the oscillations of the division head 1.

The knife carriage 19 is connected by links 24 and links 41 to an appropriate weight 42 or other means for downwardly displacing the carriage. Cam 29 is arranged to raise the carriage.

Knife 20 is connected by an adjustable link 30 to the arm 31 of a lever 31, 32 freely mounted on the shaft 26. The arm 32 of this lever carries a cam follower roller 33 engaging a cam 34 for imparting the withdrawal stroke to the knife 20. The inserting stroke of the knife into the dough column is made by means of a cam 43 engaging a roller 44 on a lateral arm 45 integral with the boss of the bell crank lever 31, 32. Pocket plungers 4 are preferably moved into their discharge position, Fig. 3, by means of an extension 46 on arm 32 that engages ram bar 10. The plungers are thus caused to move radially outward to discharge the divided dough pieces on to a receiving conveyor 35 located below the horizontal diameter of the division head 1.

The discharge of the measured dough pieces is effected by the end of the extension 46 striking ram bar 10 when the head 1 is in the discharging position. The inward movements of the plungers 4 are effected by the delivery of dough into the pockets 3, such movements being terminated by engagement of surface 9 of the ram bar 10 against gear 6.

The oscillatory return movement of the division head 1 to the dough receiving position is effected by a cam 47 engaging a roller 48 on a lever arm 49 which is connected by links 50, 51 to the trunnion 12 of the head. Movement to the discharge position is effected by cam 52 engaging roller 53 on the lever 54 and through the lever 49 and links 50, 51.

The cam shaft 55 is driven from a source of power by transmission gears including gear wheels 56.

In operation, dough charged into the hopper 15 flows in a continuous vertical stream or column into the antechamber 14 which it fully occupies. This column is severed or separated from the hopper by the inward insertion of the knife 20. After the knife 20 has cut off there is a dwell so that it occupies the active transverse position for a period, during which the knife carriage 19 makes a vertical downward stroke under an influence of the weight 42, springs, or other pressure devices. In descending, the knife 20 firmly, yet lightly, presses the foremost part of the dough column into the measurement pockets 3 of the divider head 1, at which stage there is a complete column of dough extending between the underside of the knife and the plungers 4 of the measurement pockets. The full-line position of element 4 in Fig. 2 shows 4 raised to the position where it remains until it is forced down by the dough column and the downward pressure produced by knife 20.

When the knife carriage 19 has ended its downward stroke, Fig. 3, the division head 1 is oscillated from the vertical to the discharging position shown in Fig. 4. The dough pieces in the several measurement pockets 3 are thereby severed from the dough column that is under pressure exerted downwardly by the knife in antechamber 14. When the division head comes into an angular position where the dough in the pocket 3 is thus cut off from the standing column, Fig. 4, the plungers 4 move outwardly together and eject newly divided dough pieces onto the reception conveyor 35. The dotted line position of 4 in Fig. 2 shows it retracted and ready to expel the measured dough pieces. As the upper edge of the rear wall of the measurement pockets 3 cuts off the dough, the bottom of the antechamber 14 becomes covered and sealed by the residual arcuate portion 2 of the quadrant of the division head.

After ejection of the dough pieces the head 1 moves back to the vertical or charging position prior to which the knife 20 has been withdrawn, as shown in Fig. 4; and the column of dough which had been resting on the knife now unites with the lower dough column that previously was below the knife. When the knife 20 is withdrawn as above recited, its carriage 19 makes its upstroke which returns it to its starting position. Immediately the knife makes its next transverse severing stroke across the antechamber and is ready to repeat its cycle of operation.

I claim:

1. A dough divider comprising a rotary division head or box, the dough dividing pocket of which occupies a vertical charging position, a fixed antechamber or flue disposed vertically over and mating with the division head; a carriage reciprocable upwardly and downwardly on the antechamber and having a knife positioned horizontally on the carriage and reciprocable transversely across the antechamber; an opening in the front and rear walls of the antechamber positioned in register with the path of operational movements of said carriage and of not less extent than the length of the stroke of the carriage and knife; and means for operating the knife, carriage and division head in synchronism for dividing and delivering dough pieces of predetermined weight.

2. In a dough dividing machine, in combination with a fixed flue for receiving and discharging dough in one general direction; a knife for severing the dough in said flue; a vertically movable knife-carriage supporting said knife; power-actuated mechanical means for inserting said knife, comprising a rocker-shaft, a lateral arm free on said shaft and a cam for operating said arm; means for withdrawing said knife comprising a downwardly directed arm free on said rocker-shaft and engaged by a power-driven cam, and an upwardly extending arm free on said shaft and having connections to said knife; further power means for actuating said carriage and knife upwardly comprising links connected at their upper ends to the carriage and at their lower ends to a horizontal arm of a bell-crank lever fixed on said rocker-shaft and having its downward arm engaged by a rotatable cam; and resilient pressure means normally urging said carriage downwardly; an oscillatory division head having plungers therein movable from dough-piece measuring position to discharged position; means for oscillating said head to its measuring position, comprising a cam-driven downwardly extending arm connected by links to the head; means for oscillating said head to its discharging position comprising a cam engaging a lever on said rocker-shaft; power means for operating said plungers comprising an extension on the said downwardly directed arm; and power-driven shaft and gear means synchronously connecting said head oscillating means and said ejecting means with said knife-and-carriage actuating means.

3. In a dough divider of the class described comprising a reciprocative dividing head and means for operating the same; in combination, an antechamber or flue of rectangular cross-section and straight throughout its length, having an end in operative engagement with said dividing head and having a portion of its front wall and a portion of its rear wall intermediate the ends thereof omitted to provide alike openings; a carriage member movable lengthwise on the flue; the front and rear walls of said carriage being slidably engaged with bearing surfaces on front and rear walls of said flue and also being of sufficient length to keep the said openings closed during such movements; said rear wall of the carriage having a guide element; power actuated means operatively connected to the carriage for moving the carriage lengthwise of said flue; a knife slidable back-and-forth in said guide element and across said flue; and further power actuated means operatively connected to said knife for inserting the knife into the flue at one position of the carriage and for withdrawing the knife from the flue at another position.

4. In a dough dividing machine, in combination with a fixed flue for receiving and discharging dough in one general direction; means for severing the dough in said flue; a vertically movable carriage supporting said severing means; and power actuated mechanical means for inserting and withdrawing said severing means; and further power actuated means for vertically reciprocating said carriage and said severing means; additional means for measuring dough pieces and ejecting them; and separate power means for actuating said adidtional means; all said power actuated means being operatively interconnected and synchronized and adapted for reciprocating the severing means and carriage toward and from the measuring and ejecting means; and adapted to actuate the measuring and ejecting means toward and from its dough discharging position.

5. A dough divider having in combination an antechamber or flue, straight throughout its length and having opposed walls at least one of which has a portion intermediate its ends omitted to provide an opening; a carriage member movable lengthwise of said flue in slidable engagement with the walls thereof; means yieldingly urging the carriage in one direction; power means adapted to move said carriage in the opposite direction; a knife on the carriage provided for transverse reciprocatory travel through said openings and across said flue; power-actuated means adapted to move the knife across the flue in one direction and further power actuated means to withdraw the same; a dough divider adapted to measure and sever pieces of dough received from said flue; transmission gear adapted to synchronize the operations of said knife actuating means, carriage moving means, and dough severing means.

6. A dough divider having in combination an antechamber or flue; straight throughout its length and having opposed walls at least one of which has a portion intermediate its ends omitted to provide an opening; a carriage member movable lengthwise of said flue in slidable engagement with the walls thereof; means yieldingly urging the carriage in one direction; power means adapted to move said carriage in the opposite direction; a knife on the carriage provided for transverse reciprocatory travel through said openings and across said flue; power-actuated means adapted to move the knife across the flue and withdraw the same; a dough divider adapted to measure and sever pieces of dough received from said flue; transmission means adapted to synchronize the operations of said knife actuating means, carriage moving means, and dough severing means.

JOHN EDWARD POINTON.

REFERENCES CITED

The following references are of record in the file of this patent:

UNITED STATES PATENTS

| Number | Name | Date |
|---|---|---|
| 839,941 | Lutze | Jan 1, 1907 |
| 2,351,839 | Seem | June 20, 1944 |

FOREIGN PATENTS

| Number | Country | Date |
|---|---|---|
| 17,138 | Great Britain | July 20, 1914 |
| 507,876 | Great Britain | June 22, 1939 |